(12) United States Patent
Williamson

(10) Patent No.: US 6,857,313 B2
(45) Date of Patent: Feb. 22, 2005

(54) SELF-CALIBRATING CAPACITANCE GAUGE

(75) Inventor: Cecil M. Williamson, Carrollton, TX (US)

(73) Assignee: Rochester Gauges, Inc., Dallas, TX (US)

( * ) Notice: Subject to any disclaimer, the term of this patent is extended or adjusted under 35 U.S.C. 154(b) by 52 days.

(21) Appl. No.: 10/403,203

(22) Filed: Mar. 31, 2003

(65) Prior Publication Data

US 2004/0187570 A1 Sep. 30, 2004

(51) Int. Cl.[7] .............................................. G01F 23/00
(52) U.S. Cl. ................................... 73/304 C; 340/620
(58) Field of Search ............................ 73/304 C, 1.73, 73/290 R; 340/620, 618

(56) References Cited

U.S. PATENT DOCUMENTS

| | | | |
|---|---|---|---|
| 3,901,079 A | * | 8/1975 | Vogel ........................ 73/304 C |
| 3,986,109 A | | 10/1976 | Poduje |
| 4,355,363 A | * | 10/1982 | Colby et al. ................... 702/52 |
| 4,383,444 A | * | 5/1983 | Beaman et al. ........... 73/304 C |
| 4,387,334 A | | 6/1983 | Loper |
| 4,417,473 A | | 11/1983 | Tward et al. |
| 4,545,020 A | | 10/1985 | Brasfield |
| 4,589,077 A | | 5/1986 | Pope |
| 4,590,575 A | * | 5/1986 | Emplit ........................ 702/52 |
| 4,617,512 A | | 10/1986 | Horner |
| 4,709,225 A | | 11/1987 | Welland et al. |
| 4,731,730 A | | 3/1988 | Hedrick et al. |
| 4,782,215 A | | 11/1988 | Kadwell et al. |
| 4,806,847 A | | 2/1989 | Atherton et al. |
| 4,922,081 A | | 5/1990 | Kadwell et al. |
| 5,051,921 A | | 9/1991 | Paglione |
| 5,103,368 A | | 4/1992 | Hart |
| 5,756,876 A | | 5/1998 | Wetzel et al. |
| 5,765,434 A | | 6/1998 | Harbaugh |
| 5,790,422 A | | 8/1998 | Power et al. |
| 5,838,241 A | | 11/1998 | Lease et al. |
| 6,016,697 A | | 1/2000 | McCulloch et al. |
| 6,101,873 A | | 8/2000 | Kawakatsu et al. |
| 6,220,096 B1 | | 4/2001 | Gutierrez et al. |
| 6,265,883 B1 | | 7/2001 | Clark |
| 6,380,750 B1 | | 4/2002 | Schenck, Jr. et al. |
| 6,443,006 B1 | * | 9/2002 | Degrave ................... 73/304 C |
| 6,497,145 B1 | | 12/2002 | Ross, Jr. |
| 2001/0003426 A1 | | 6/2001 | Matter et al. |

FOREIGN PATENT DOCUMENTS

| | | |
|---|---|---|
| CN | 1346963 | 5/2002 |
| EP | 0 101 580 A1 | 2/1984 |
| GB | 2 043 259 A | 10/1980 |
| WO | WO 01/79789 A2 | 10/2001 |

* cited by examiner

*Primary Examiner*—Hezron Williams
*Assistant Examiner*—K. Wilson
(74) *Attorney, Agent, or Firm*—Sidley Austin Brown & Wood LLP (57) ABSTRACT

A capacitive gauge, suitable for measuring a fluid level in a container, includes upper and lower capacitive elements. Also provided is a control unit for calculating the fluid level in the container based on the capacitance of the upper and lower capacitors and a dielectric constant of the fluid in the container. The control unit also includes functionality for determining and storing the dielectric constant of the fluid in the container. The dielectric constant of the fluid is determined by first verifying whether the lower capacitive element is completely submerged based on a comparison of a measured capacitance of the upper capacitor to a reference capacitance of the upper capacitor. If the lower capacitor is verified to be submerged, then the dielectric constant of the fluid is calculated based on a measured capacitance of the lower capacitor.

36 Claims, 4 Drawing Sheets

SELF-CALIBRATING CAPACITANCE GAUGE

FIELD OF THE INVENTION

The present invention relates to gauges suitable for monitoring the level of fluid in a container, and in particular relates to gauges that use one or more capacitive elements, where the fluid in the container can form at least part of the dielectric of one or more of the capacitive elements depending on the level of the fluid.

BACKGROUND

Capacitors have been well known for many years. In general terms, a capacitor is formed of two isolated conductors of arbitrary shape. Regardless of their geometry, the conductors are referred to herein as plates. The plates of a capacitor can be charged such that a potential difference (voltage) exists between the plates. The ratio between the charge on the plates and the voltage difference between the plates is known as the capacitance of the capacitor.

The capacitance of a capacitor is dependent on several factors, such as the size of the plates, the distance between the plates, and the material between the plates. In order to determine the effect a material will have when placed between the plates, a factor known as the dielectric constant is assigned as a property of the material. For example, the dielectric constant of a vacuum is one, of air is close to one, of gasoline (70° F.) is 2, of industrial alcohol is anywhere from 16–31, and of water (20° C.) is 80.

The effect a dielectric constant has on the capacitance of a capacitor is significant. In fact, thanks to work done by Michael Faraday in the early 1800's, it is known that capacitance is directly proportional to the dielectric constant of the material interposed between the plates.

The fact that the capacitance of a capacitor changes with changes in the dielectric constant of the material between the plates has been exploited in the past to use capacitors as a means for measuring the amount of liquid in a container. The basic idea is to place a pair of opposing plates in a container for storing some sort of liquid or fluid, such as water. Since the dielectric of water is about eighty times that of air, the capacitance of the capacitor will rise as the water rises between the plates. This information can be used by a processor to determine, using a look-up table, interpolation, or a calculation of some kind, the water level in the container.

The principle drawback to capacitance gauges such as the one described above is that significant inaccuracies can occur due to changes in the dielectric constant in the liquid in the container. For example, it is well-known that the dielectric constant of many materials can vary with changes in temperature and as contaminants are introduced into the material. Another problem can occur if the container is used for a variety of types of liquids. In the example above, the container could be filled with gasoline having a dielectric constant of two at some point instead of water. In that case, when the processor makes a calculation to determine the level of gasoline in the container based on the dielectric constant of water, which is 80, the result would be completely unreliable.

This is similar to a situation that happens with some types of vehicles, where the type of fuel put into the fuel tank can vary, which causes variations in the dielectric constant of the fluid in the fuel tank. For example, as noted above the dielectric of alcohol is as much as fifteen times that of gasoline, making the difference between gasoline and gasohol significant in terms of dielectric constants. In addition, sometimes additives such as deicers are introduced into the fuel tanks, and inevitably contaminants accumulate in the fuel tanks as well. All of this contributes to variations in the dielectric constant of fluid in the fuel tank that can cause inaccurate indications of fuel levels if not accounted for.

SUMMARY OF THE INVENTION

According to one aspect of the invention, a gauge is provided that is suitable for measuring a level of fluid in a container comprising first and second capacitive elements, a nonvolatile memory, and a control unit. Each of the capacitive elements has a measured capacitance that varies for a respective range of fluid levels. The nonvolatile memory stores a reference capacitance of the second capacitive element representative of a situation where none of the second capacitive element is submerged in the fluid. The control unit is for determining whether conditions are satisfactory for performing a calibration routine. When conditions are determined to be satisfactory, the control unit determines a dielectric constant of the fluid based on a calculation involving the measured capacitance of the second capacitor and the reference capacitance of the second capacitor.

The control unit can make the determination of whether conditions are satisfactory based on the measured capacitance of the first capacitive element. It can make this determination based on a comparison of the measured capacitance of the first capacitive element to a reference capacitance of the first capacitive element. The reference capacitance of the first capacitive element can be a capacitance of the first capacitive element representative of a situation where none of the first capacitive element is submerged in the fluid. The reference capacitance of the first capacitive element can be stored in the nonvolatile memory.

The control unit can determines conditions unsatisfactory for performing the calibration routine if the measured capacitance of the first capacitive element is equal to the reference capacitance of the first capacitive element.

The gauge can further comprise an input section for inputting to the control unit the measured capacitance of the first capacitive element and inputting to the control unit the measured capacitance of the second capacitive element.

When the control unit calculates the dielectric constant, the control unit can store the thus calculated dielectric constant in the nonvolatile memory.

The entire second capacitive element can be disposed below the entire first capacitive element relative to the fluid level being monitored. The determination by the control unit that the conditions for performing the calibration routine are satisfactory can include verifying that the second capacitive element is completely submerged in the fluid. This can be done by determining if any portion of the first capacitive element is submerged in the fluid. A determination as to whether any portion of the first capacitive element is submerged in the fluid can be made by comparing the measured capacitance of the first capacitive element to the reference capacitance of the first capacitive element mentioned above.

According to another aspect of the invention, calibration system is provided for a fluid-level gauge having first and second capacitive elements, each of the capacitive elements having a capacitance that varies within a respective range of fluid levels. The calibration system comprises a measuring section, a memory, and a calculating section. The measuring section is for determining a measured capacitance of the first capacitive element and a measured capacitance of the second capacitive element. The memory is for storing a reference capacitance of the second capacitive element representative of a situation where none of the second capacitive element is submerged in the fluid. The calculating section is for determining whether conditions are satisfactory for performing a calibration routine. The calculating section is also for, when said conditions are determined to be satisfactory, determining a dielectric constant of the fluid based on a calculation involving the measured capacitance of the second capacitive element and the reference capacitance of the second capacitive element.

The memory can also store a reference capacitance of the first capacitive element representative of a situation where none of the first capacitive element is submerged in the fluid. In addition, the calibration system can further comprise a comparing section for determining a comparison value based on a comparison of the measured capacitance of the first capacitive element and the reference capacitance of the first capacitive element. Then, the calculating section can use the comparison value for a calculation for determining whether said conditions are satisfactory.

According to another aspect of the invention, a gauge suitable for measuring a level of fluid in a container is provided, the gauge comprising a first capacitive element, a second capacitive element, a nonvolatile memory, and a control unit. The first and second capacitive elements each have a capacitance that varies for a respective one of a first and second range of fluid levels. The nonvolatile memory is for storing a reference capacitance of the second capacitive element representative of a situation where none of the second capacitive element is submerged in the fluid. The control unit is for determining, based on a measured capacitance of the first capacitive element, whether conditions are satisfactory for proceeding with calculating a dielectric constant of the fluid. When the conditions are determined to be satisfactory, the control unit calculates the dielectric constant of the fluid based on a calculation involving a measured capacitance of the second capacitor and the reference capacitance of the second capacitor.

The first range of fluid levels and the second range of fluid levels can be mutually exclusive, wherein the second range of fluid levels can be lower than the first range of fluid levels.

When the conditions are determined to be satisfactory, and the control unit determines the dielectric constant of the fluid, the thus determined dielectric constant can be stored in the nonvolatile memory. The control unit can then determine an amount of fluid based on a calculation including the dielectric constant stored in the nonvolatile memory.

When said conditions are not determined to be satisfactory, the control unit can be configured to not continue with making a calculation of the dielectric constant. Then, the control unit can make subsequent determinations of amounts of fluid based on a calculation including a dielectric constant previously stored in the nonvolatile memory at least until a next determination is made by the control unit as to whether said conditions are satisfactory for proceeding with calculating the dielectric constant of the fluid.

According to another aspect of the invention, a method is provided of maintaining the calibration of a gauge for measuring a level of fluid, where the gauge has first and second capacitive elements, and each of the capacitive elements has a capacitance that varies within a respective range of fluid levels. The method comprises the steps of (a) determining a measured capacitance of the first capacitive element and (b) determining whether conditions are satisfactory for performing a calibration routine based on the measured capacitance of the first capacitive element. If the conditions are determined to be satisfactory in step (b), a step (c) is performed, which includes the steps of (c1) determining a measured capacitance of the second capacitive element, (c2) obtaining a previously stored reference capacitance of the second capacitive element representative of a situation where none of the second capacitive element is submerged in the fluid, and (c3) determining a dielectric constant of the fluid based on a calculation involving the measured capacitance of the second capacitive element and the reference capacitance of the second capacitive element.

In step (b), the determination as to whether conditions are satisfactory can be based on a comparison of the measured capacitance of the first capacitive element to a reference capacitance of the first capacitive element. The reference capacitance of the first capacitive element can be a capacitance of the first capacitive element representative of a situation where none of the first capacitive element is submerged in the fluid. Step (b) can include retrieving the reference capacitance of the first capacitive element from a nonvolatile memory. In step (b), the determination can be made that conditions are unsatisfactory for performing the calibration routine if the measured capacitance of the first capacitive element is equal to the reference capacitance of the first capacitive element.

Step (c) can further include the step of (c4) storing the dielectric constant calculated in step (c3) in a nonvolatile memory.

Step (b) can include verifying that the second capacitive element is completely submerged in the fluid. Step (b) can include verifying that the second capacitive element is completely submerged in the fluid by determining if any portion of the first capacitive element is submerged in the fluid. Step (b) can include determining if any portion of the first capacitive element is submerged in the fluid by comparing the measured capacitance of the first capacitive element to the reference capacitance of the first capacitive element mentioned above.

BRIEF DESCRIPTION OF THE DRAWINGS

Several embodiments of the present invention will now be described by way of example only, with reference to the accompanying drawings in which.

DETAILED DESCRIPTION OF THE DRAWINGS

The present invention will now be discussed with reference to the drawings. For convenience, the terms "upper" and "lower" will be used in the following discussion referring to relative positions as shown in the Figures.

Figure 1:
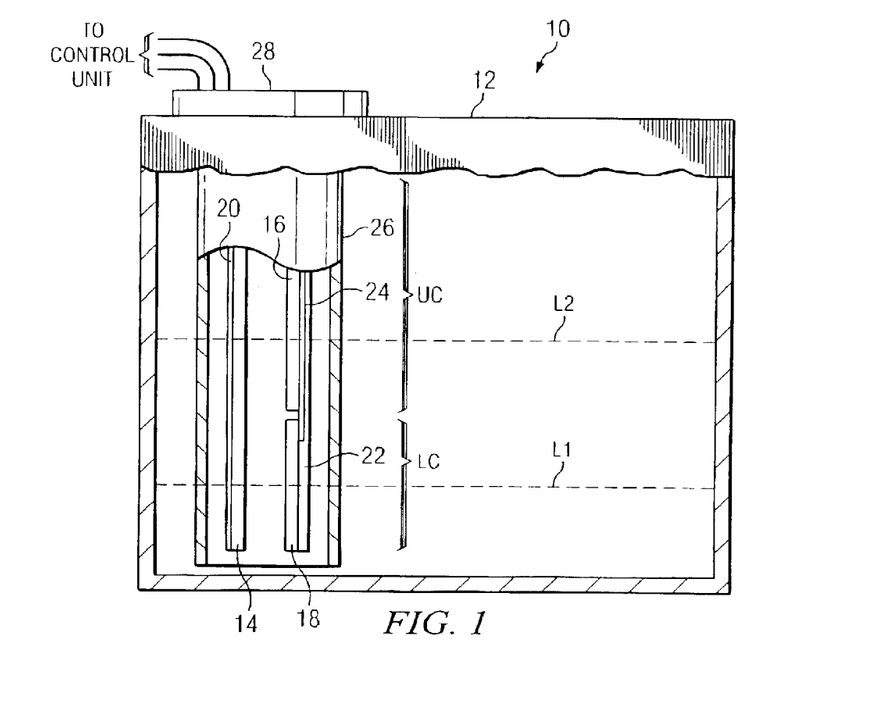
FIG. 1 is a partially-sectioned view of a fluid-level measuring device.

FIG. 1 shows an embodiment of a fluid-level measuring device of the present invention. In FIG. 1, a fluid-level measuring device 10 is shown in position for measuring a level of fluid in a container 12. The container 12 can be any kind of container, since, as will be discussed in further detail below, provisions are made for containers of a variety of shapes and sizes.

The measuring device 10 is a capacitive-type measuring device, having a common conductive plate 14 opposed by both an upper conductive plate 16 and a lower conductive plate 18. The upper and lower plates 16 and 18 are electrically isolated from each other. As shown in FIG. 1, the upper plate 16 opposes the common plate 14 to form an upper capacitor UC, which is an embodiment of a first capacitive element, and the lower plate 18 opposes the common plate 14 to form a lower capacitor LC, which is an embodiment of a second capacitive element. The common plate 14 is supported by a first substrate 20, and the upper and lower plates 16 and 18 are supported by a second substrate 22. The first and second substrates 20 and 22 can be made of any rigid, non-conductive material. The first and second substrates 20 and 22 can also be used for supporting one or more respective lead lines from the plates 14, 16, and 18. As an example, FIG. 1 shows a lead line 24 from the lower plate 18 that is supported by the second substrate 22.

In a preferred embodiment, the plates 14, 16, and 18 are made using etched wiring board methods to produce rectangular metal plates on non-conductive substrates. Provisions for electrical connections can be included in the manufacturing process by etching on the non-conductive substrates. The upper and lower plates 16 and 18 can be formed by electrically isolating portions of a pre-formed metal plate into upper and lower sections.

One consideration with regard to the upper and lower plates 16 and 18 is the ratio of plate lengths. The measuring device 10 requires no particular plate length ratio in order to function properly. However, the relative length of the upper and lower plates 16 and 18 should be considered nonetheless. There exist benefits to the lower plate 18 being longer and shorter, thus a trade-off exists between the two extremes. On the one hand, a longer lower plate 18 will provide somewhat better accuracy. On the other hand, a shorter lower plate 18 will allow recalibration at lower fluid levels (which will become more apparent based on the discussion below). Therefore, the final decision for the length of lower plate 18 can depend on application-specific priorities, such as container shape.

Finally, the measuring device 10 can include a tube 26, shown partially sectioned in FIG. 1. The tube 26 is supported on the upper end by a gauge head 28. The tube 26 is open on the lower end to allow free movement of fluid in and out, thereby allowing the level of fluid inside the tube 26 to be the same as the level of fluid outside the tube 26. Naturally, provisions should be made for the displacement of air from an upper portion of the tube 26 to prevent air pressure or the like from hindering the movement of fluid in and/or out of the tube 26. The tube 26 houses the upper capacitor UC and lower capacitor LC, acting as a baffle to mitigate fluid turbulence that could otherwise damage the capacitors UC and LC and/or cause inaccuracies in measurements being made by the measuring device 10. Thus, it is desirable for the tube 26 to be made of a rigid material.

The gauge head 28 serves to support the tube 26 as mentioned above, as well as the upper and lower capacitors UC and LC relative to the container 12. The gauge head 28 also provides passage for communication lines from the upper and lower capacitors UC and LC.

Figure 2:
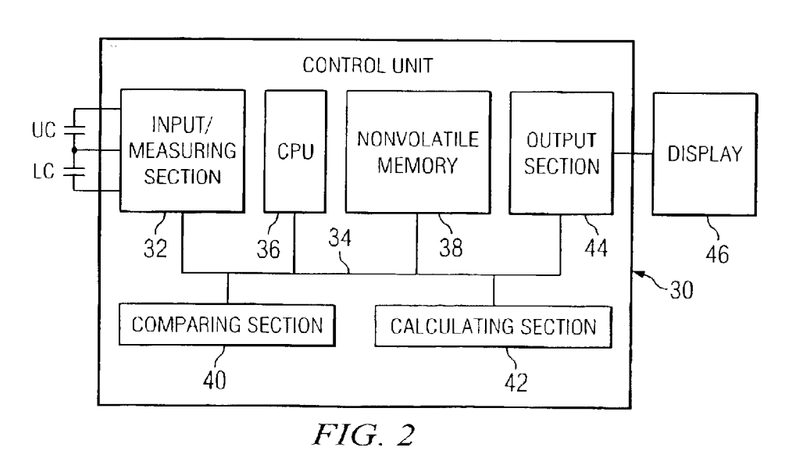
FIG. 2 is a schematic block diagram of a calibration unit for calibrating a fluid-level measuring device.

As shown in FIG. 1, the communication lines from the upper and lower capacitors UC and LC go to a control unit 30, which is shown in FIG. 2. Referring now to FIG. 2, the control unit includes an input/measuring section 32 for inputting and measuring values from the upper and lower capacitors UC and LC. The control unit 30 also includes a data bus 34 controlled by a central processing unit (CPU) 36. The control unit 30 includes a nonvolatile memory 38 for storing various data as will be discussed in greater detail below. The control unit 30 includes a comparing section 40 and a calculating section 42 which are used for processes discussed below. Finally, the control unit 30 includes an output section 44 for outputting information from the control unit 30. As an example, the output section 44 can be used to output information to a display 46 as shown in FIG. 2.

It should be noted that the control unit 30 shown in FIG. 2 can be implemented in many different ways, including the use of electronic hardware, software, and combinations thereof The specific connections and blocks shown in the block diagram of FIG. 2 are in no way intended to be limiting, since there are almost any number of ways that the blocks can be divided or combined and connected without deviating from the spirit and scope of the present invention.

Furthermore, it is contemplated that instead of having a control unit 30 that is somewhat remotely located from the measuring device 10 as shown in FIGS. 1 and 2, the control unit 30 and measuring device 10 could be integrated into a single unit if so desired. For example, the control unit 30 could be located inside the gauge head 28, with some means for communication to an external display replacing the communication lines shown in FIG. 1 to the control unit. In fact, it is further contemplated that the measuring device 10 and control unit 30 could be provided with a display to make it a "stand alone" unit. The stand alone unit could, of course include a power supply such as a battery or rechargeable power source.

Figure 3:
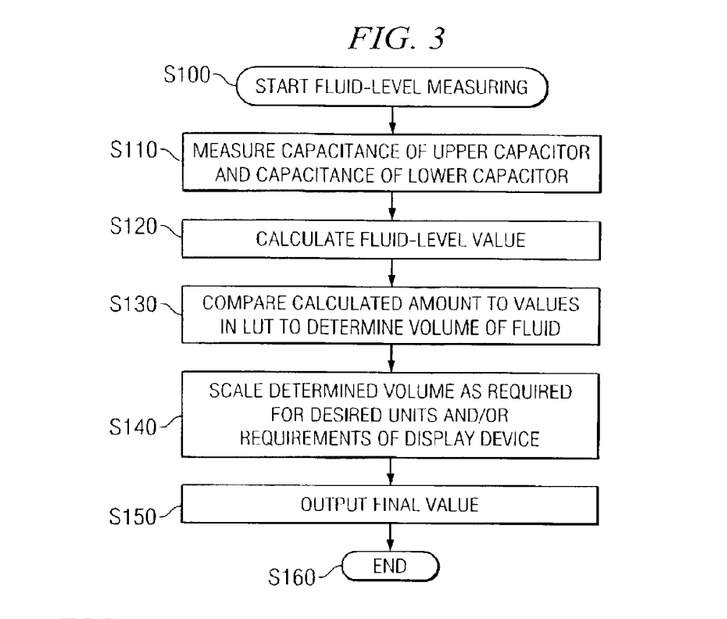
FIG. 3 is a flow chart of a fluid-level measuring routine.

The process of measuring a level of the fluid in the container 12 will now be discussed with reference to the fluid-level measuring process charted in FIG. 3. The measuring process begins at step S100, where, for example, an initiation signal of some kind has been received. At step S110, the input/measuring section 32 determines the capacitance of each of the upper and lower capacitors UC and LC. Then, at step S120, the calculating section 42 will calculate a fluid-level value based on the measured capacitances determined by the input/measuring section 32 at step S110.

It is possible to use capacitance to measure an amount of fluid in the container 12 at step S120 as follows. In general, it is known that capacitance is governed by the following relationship:

$$C = \epsilon_0 \kappa L \qquad \text{[Eq. 1]}$$

where C is an amount of capacitance, $\epsilon_0$ is the well-known permittivity constant, $\kappa$ is the dielectric constant, and L is a "length". In the case of a parallel-plate capacitor, the following relationship is known for L:

$$L = A/d \qquad \text{[Eq. 2]}$$

where A is the area of the plates and d is the distance between the plates. Substituting equation 2 into equation 1 yields the following relationship for capacitance in the case of parallel-plate capacitors:

$$C = \epsilon_0 \kappa (A/d) \qquad \text{[Eq. 3]}$$

Based on equation 3, it can be concluded that in a device such as the present fluid-level measuring device 10, where the values for the area of the plates 14, 16, and 18, the distance between the common plate 14 and each of the upper and lower plates 16 and 18, and the permittivity constant co are all fixed, the capacitance C is only going to vary based on changes in the dielectric constant κ. Referring back to the description above of the fluid-level measuring device 10 shown in FIG. 1, it was pointed out that the fluid being measured was free to flow in and out of the tube 26 such that the level of fluid in the tube 26 was equal to the level of fluid outside of the tube 26. As the fluid rises and lowers in the tube 26, the fluid interposes various amounts of the common plate 14 and each of the upper and lower plates 16 and 18 of the upper and lower capacitors UC and LC, respectively. Since the dielectric constant κ of the fluid is different than the dielectric constant of air, as the capacitors UC and LC become submerged in the fluid their respective capacitances will change according to equation 3. Based on this effect, the calculating section 42 can derive the fluid-level value. Since the dielectric constant for air and the dielectric constant κ of the fluid are both known and stored in the memory 38, the calculating section 42 solves for parts of the area A of opposing plates of a capacitor in question interposed by air and/or parts of the area A of opposing plates interposed by fluid. Once the areas A are known, it can be deduced how high the fluid is relative to the plates of the capacitor in question.

The calculating section 42 obtains area information and distance information about the upper and lower capacitors UC and LC from the nonvolatile memory 38. This area and distance information is stored in the nonvolatile memory 38 during the manufacturing process. An initial dielectric constant κ for fluid expected to be measured can optionally be stored in the nonvolatile memory 38 during manufacturing.

Once the fluid-level value has been determined at step 120, the value is compared by the comparing section 40 to values in a look-up table (LUT) stored in the nonvolatile memory 38. The use of the LUT compensates for the shape of the container 12 by comparing the fluid-level value to a calibration curve. This curve correlates the fluid-level value with the volume of fluid left in the container 12. This allows the volume to be determined more accurately, especially if the container 12 has a relatively complicated shape. Thus, the comparing section 40 outputs a compensated fluid-level value.

At step S140, the compensated fluid-level value is conditioned by the output section 44 as required based on the input requirements of the display 46. Examples of signal conditioning include scaling the compensated fluid-level value to a particular unit of measurement and/or provide some signal damping. Once the signal is ready, at step S150 it is output from the output section 44. Then, at step S160 the process of measuring the level of the fluid ends.

A principle inaccuracy can occur at step S120 above, where the fluid-level value is calculated, due to the fact that the dielectric constant K of different fluids can vary. The dielectric constant of alcohol, for instance, is approximately fifteen times that of gasoline. Thus, if the dielectric constant κ of gasoline were used at step S120 to calculate the fluid level in a container of gasohol, for example, the accuracy would be poor at best. It is therefore desirable to have a process for determining the dielectric constant of the fluid being measured, and automatically correct the dielectric constant K for subsequent fluid-level calculations being made. The present invention includes such a process, which will be discussed next with reference to FIG. 4.

Figure 4:
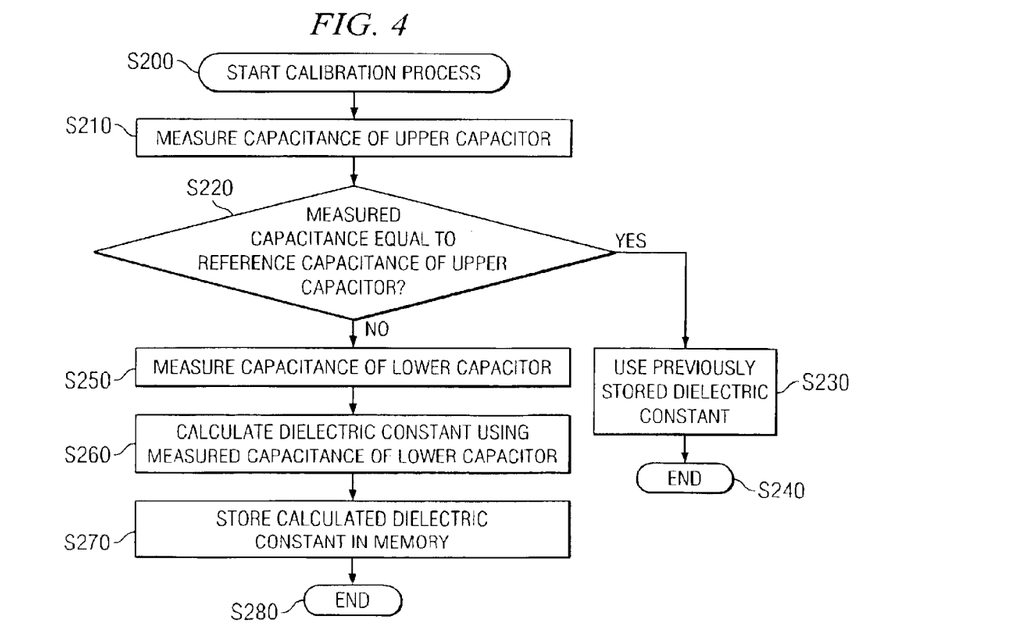
FIG. 4 is a flow chart of a calibrating routine.

FIG. 4 shows a flow-chart of a calibration routine for determining the dielectric constant of the fluid being measured. The calibration routine starts at step S200, which can be initiated several different ways. For example, the calibration routine can be designated to run at periodic intervals, upon application of power to a system, during maintenance checks, and/or when the container 12 is filled. At step S210, the input/measuring section 32 of the control unit 30 measures the capacitance of the upper capacitor UC, and at step S220 the comparing section 40 compares the measured capacitance of the upper capacitor UC to a reference capacitance of the upper capacitor UC stored in the nonvolatile memory 38. The reference capacitance of the upper capacitor UC is a capacitance of the upper capacitor UC with no fluid between common plate 14 and upper plate 16. The reference capacitance can be measured and stored in nonvolatile memory 38 during manufacturing.

The steps S210 and S220 amount to a verification portion of the calibration process. In order to determine the dielectric constant of the fluid in the container 12 according to this calibration process, it is necessary that the lower capacitor LC be completely submerged. Thus, verifying that at least a portion of the upper capacitor UC is submerged serves to confirm that conditions are acceptable for calculating the dielectric constant of the fluid in the container 12. By measuring the capacitance of the upper capacitor UC and comparing the measured capacitance to a known reference capacitance, taken when there is no fluid between the plates, a determination can confidently be made as to whether any portion of the upper capacitor UC is submerged. Since the measured value and the reference value only need to be compared in order to confirm whether even a portion of the upper capacitor UC is submerged, it is not necessary to know the dielectric constant κ of the fluid in the container 12 at this point.

Thus, at step S220, if the measured capacitance of the upper capacitor UC is equal to the reference capacitance of the upper capacitor UC, it can be inferred that no portion of the upper capacitor UC is submerged. For example, this is the situation that would be expected if the fluid in the container 12 were at the level indicated by L1 in FIG. 1. In this case, conditions are not satisfactory for proceeding with calculating the dielectric constant IC of the fluid in the container 12, so the calibration process continues with step S230 where it is noted that whatever dielectric constant was previously stored in nonvolatile memory 38 will continue to be used. At step S240 the calibration process ends.

However, if at step S220 the measured capacitance of the upper capacitor UC is not equal to the reference capacitance of the upper capacitor UC, it can be inferred that at least a portion of the upper capacitor UC is submerged. For example, this is the situation that would be expected if the fluid in the container 12 were at the level indicated by L2 in FIG. 1. In this case, conditions are satisfactory for proceeding with calculating the dielectric constant K of the fluid in the container 12, so the calibration process continues with step S250.

At step S250, the input/measuring section 32 measures the capacitance of the lower capacitor LC, now known to be completely submerged since at least a portion of the upper capacitor UC is submerged. The measured value is provided to the calculating section 42, which at step S260 calculates the dielectric constant κ of the fluid in the container 12. The determination of the dielectric constant K of the fluid in the container 12 is carried out using equation 3 above, only this time the calculating section 42 knows the area (since it is known that the lower capacitor is completely submerged) and is instead solving for the dielectric constant κ. Once the calculating section 42 has calculated the dielectric constant κ, the calculated dielectric constant κ is stored in memory 38 at step S270. The new dielectric constant κ can replace any former dielectric constant κ for the fluid that may have been previously stored in the nonvolatile memory 38. Thus, having updated the dielectric constant κ for the fluid in the container 12, the calibration process ends at step S280.

It is contemplated that a sensor of some kind could be used to determine if the fluid level is at a level to completely submerge the lower capacitor LC in addition to or in place of the verification portion of the calibration process discussed above. However, while such an addition is feasible and could possibly add a degree of reliability and/or precision, such an addition would likely also add unnecessary expense and complexity to the system.

Figure 5:
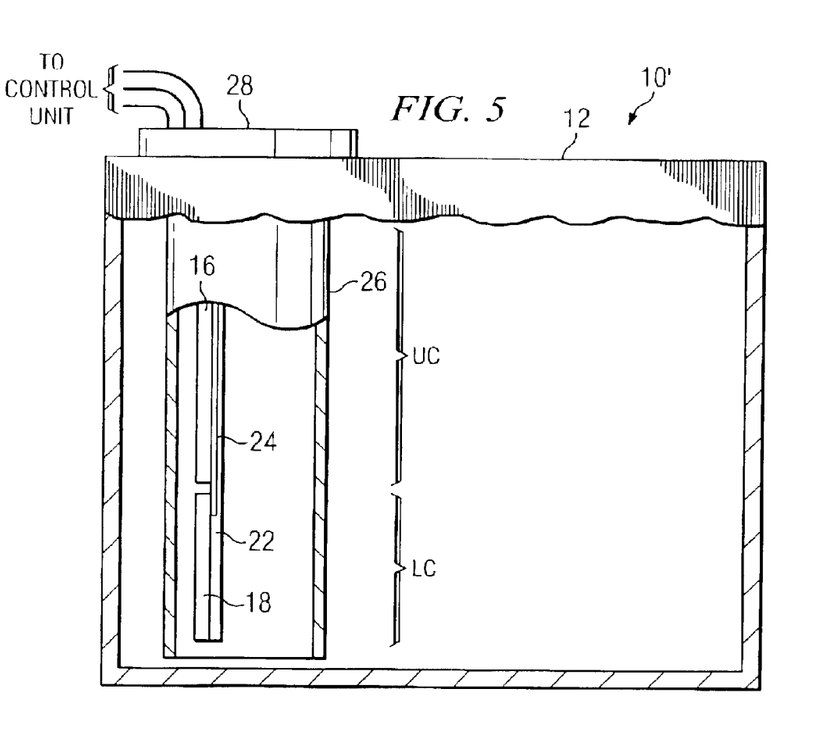
FIG. 5 is a partially-sectioned view of an alternate fluid-level measuring device.

Referring now to FIG. 5, a fluid-level measuring device 10' is shown as an alternate embodiment of the fluid measuring device 10 shown in FIG. 1. The fluid-level measuring devices 10 and 10' share several common parts as indicated by the use of common part numbers in the figures. For the sake of brevity, features of the fluid-level measuring device 10' found in the discussion of the fluid-level measuring device 10 will not be discussed again here.

As mentioned, the fluid-level measuring device 10' is somewhat similar to the fluid-level measuring device 10, except that the common plate 14 and its corresponding substrate have been omitted in the fluid-level measuring device 10'. In addition, the tube 26 must be made of a conductive material, or have an internal conductive coating at least opposing a portion of each of upper and lower plates 16 and 18. The tube 26 can be made with a flat side to provide for a constant distance between the inner surface of the tube 26 and the upper and lower plates 16 and 18.

Figure 6:
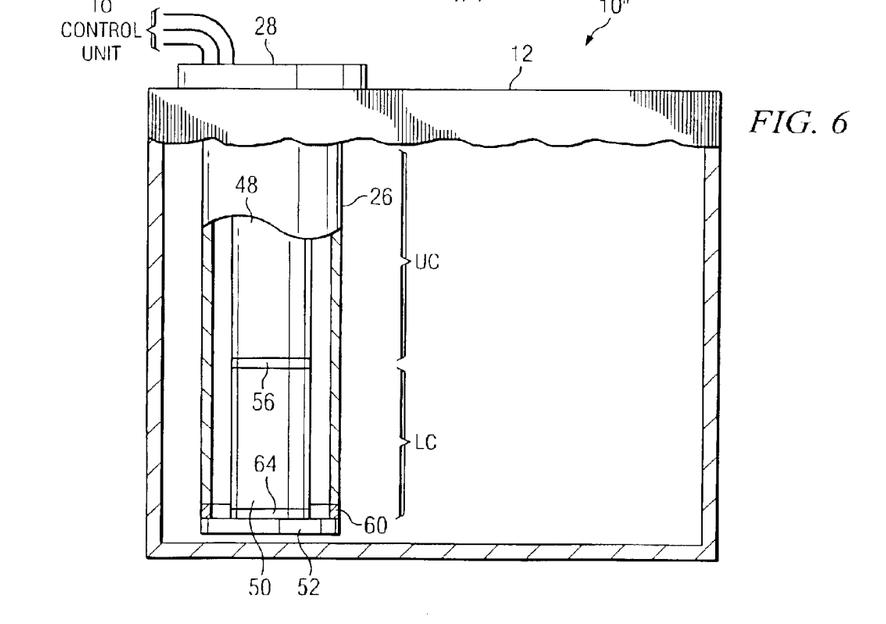
FIG. 6 is a partially-sectioned view of a second alternate fluid-level measuring device.

Referring next to FIG. 6, a fluid-level measuring device 10" is shown as another alternate embodiment of the fluid measuring device 10 shown in FIG. 1. The fluid-level measuring devices 10 and 10" share several common parts as indicated by the use of common part numbers in the figures. For the sake of brevity, features of the fluid-level measuring device 10" found in the discussion of the fluid-level measuring device 10 will not be discussed again here.

In the fluid-level measuring device 10" shown in FIG. 6, the upper and lower plates 14 and 16 and the supporting substrate 22 have been replaced with inner tubes 48 and 50, and the common plate 14 and the supporting substrate 20 have been discarded as in the fluid-level measuring device 10'. Also, like the fluid-level measuring device 10', the tube 26 must be made of a conductive material, or have an internal conductive coating that opposes at least a portion of inner tubes 48 and 50. Likewise, inner tubes 48 and 50 must be made of a conductive material, or each have an external conductive coating that opposes at least a portion of the conductive portion of the tube 26, allowing the formation of upper and lower capacitors UC and LC.

Figure 7:
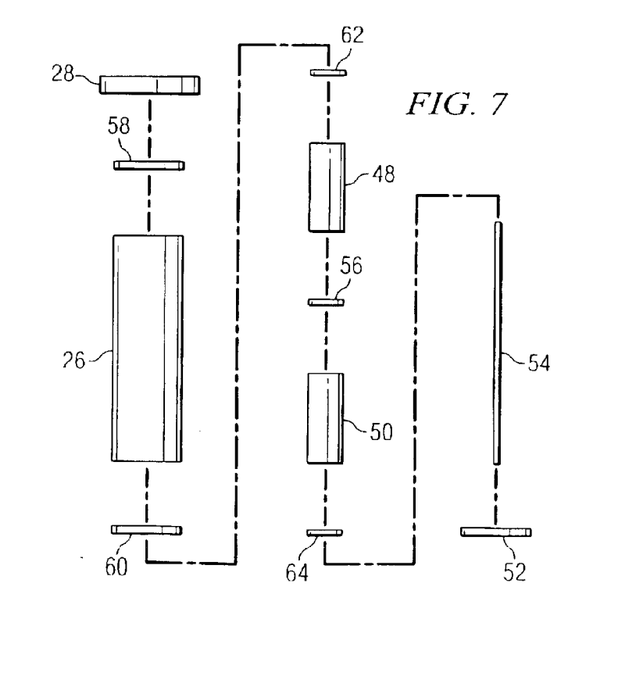
FIG. 7 is an exploded view of the fluid-level measuring device shown in FIG. 6.

A more detailed explanation of the construction of the fluid-level measuring device 10" will be discussed with reference to FIG. 7, which is an exploded view of the fluid-level measuring device 10". The fluid-level measuring device 10" includes the head 28, the tube 26, inner tubes 48 and 50, an endplate 52, and a tie rod 54 to hold the assembly together. The inner tubes 48 and 50 are placed end to end and separated by an insulator 56. An insulator 58 separates the tube 26 and the head 28, an insulator 60 separates the tube 26 and the endplate 52, an insulator 62 separates the inner tube 48 from the head 28, and an insulator 64 separates the inner tube 50 from the endplate 52. The combination of the inner tubes 48 and 50 and the insulator 56 are made so that their combined length is somewhat the same as that of the tube 26. The diameter of the inner tubes 48 and 50 and the insulator 56 is such that when assembled, two concentric cylinders are formed with a gap between them. Holes (not shown) in the end plate 52 and near the head 28 allow fluid to enter the gap between the concentric cylinders.

The control unit 30 shown in FIG. 2 can be used with the fluid-level measuring devices 10' and 10" just as described with regard to the fluid-level measuring device 10. Also, the processes shown in FIGS. 3 and 4 can be used with the fluid-level measuring devices 10' and 10" just as described with regard to the fluid-level measuring device 10.

While endeavoring in the foregoing specification to draw attention to those features of the invention believed to be of particular importance, it should be understood that the Applicant claims protection in respect of any patentable feature, or combination of features, hereinbefore referred to and/or shown in the drawings, whether or not particular emphasis has been placed thereon.

What is claimed is:

1. A gauge suitable for measuring a level of fluid in a container, the gauge comprising:
    a first capacitive element having a measured capacitance that varies for a first range of fluid levels;
    a second capacitive element having a measured capacitance that varies for a second range of fluid levels;
    a nonvolatile memory for storing a reference capacitance of said first capacitive element representative of a situation where none of said first capacitive element is submerged in the fluid; and
    a control unit for determining whether conditions are satisfactory for performing a calibration routine, wherein the control unit determines whether conditions are satisfactory based on a comparison of the measured capacitance of said first capacitive element to the reference capacitance of said first capacitive element, wherein, when said conditions are determined to be satisfactory, the control unit determines a dielectric constant of the fluid based on a calculation involving the measured capacitance of said second capacitive element.

2. A gauge according to claim 1, wherein reference information related to said second capacitive element is stored in the nonvolatile memory.

3. A gauge according to claim 2, wherein the calculation for determining the dielectric constant of the fluid uses the measured capacitance of said second capacitive element and the reference information related to said second capacitive element.

4. A gauge according to claim 1, wherein the control unit determines conditions are unsatisfactory for performing said calibration routine if the measured capacitance of said first capacitive element is equal to the reference capacitance of said first capacitive element.

5. A gauge according to claim 1, further comprising an input section for inputting to the control unit the measured capacitance of said first capacitive element and inputting to the control unit the measured capacitance of said second capacitive element.

6. A gauge according to claim 1, wherein, when the control unit calculates the dielectric constant, the control unit stores the thus calculated dielectric constant in the nonvolatile memory.

7. A gauge according to claim 1, wherein at least one entire conductive surface of said second capacitive element is disposed below at least one conductive surface of said first capacitive element relative to the fluid level being monitored.

8. A gauge suitable for measuring a level of fluid in a container, the gauge comprising:
- a first capacitive element having a measured capacitance that varies for a first range of fluid levels;
- a second capacitive element having a measured capacitance that varies for a second range of fluid levels;
- a nonvolatile memory for storing a reference capacitance of said second capacitive element representative of a situation where none of said second capacitive element is submerged in the fluid; and
- a control unit for determining whether conditions are satisfactory for performing a calibration routine,
- wherein, when said conditions are determined to be satisfactory, the control unit determines a dielectric constant of the fluid based on a calculation involving the measured capacitance of said second capacitive element and the reference capacitance of said second capacitive element,
- wherein at least one entire conductive surface of said second capacitive element is disposed below at least one conductive surface of said first capacitive element relative to the fluid level being monitored, and
- wherein the determination by the control unit that the conditions for performing a calibration routine are satisfactory includes verifying that said second capacitive element is completely submerged in the fluid.

9. A gauge according to claim 8, wherein the verification by the control unit that said second capacitive element is completely submerged in the fluid includes verifying that said second capacitive element is completely submerged in the fluid by determining if any portion of said first capacitive element is submerged in the fluid.

10. A gauge according to claim 9, wherein the determination, by the control unit, that any portion of said first capacitive element is submerged includes determining if any portion of said first capacitive element is submerged in the fluid by comparing the measured capacitance of said first capacitive element to a reference capacitance of said first capacitive element.

11. A gauge according to claim 10, wherein the reference capacitance of said first capacitive element is a capacitance of said first capacitive element representative of a situation where none of said first capacitive element is submerged in the fluid.

12. A calibration system for a fluid-level gauge, the gauge having first and second capacitive elements, each of the capacitive elements having a capacitance that varies within a respective range of fluid levels, the system comprising:
- a measuring section for determining a measured capacitance of the first capacitive element and a measured capacitance of the second capacitive element;
- a memory for storing a reference capacitance of said first capacitive element representative of a situation where none of said first capacitive element is submerged in the fluid;
- a comparing section for determining a comparison value based on a comparison of the measured capacitance of said first capacitive element and the reference capacitance of said first capacitive element,
- a calculating section for determining, based on the comparison value, whether conditions are satisfactory for performing a calibration routine, and for, when said conditions are determined to be satisfactory, determining a dielectric constant of the fluid based on a calculation involving the measured capacitance of said second capacitive element.

13. A calibration system according to claim 12, wherein the memory stores reference information regarding said second capacitive element.

14. A calibration system according to claim 13, wherein the calculation for determining the dielectric constant of the fluid involves the measured capacitance of said second capacitive element and the reference information regarding said second capacitive element.

15. A calibration system for a fluid-level gauge, the gauge having first and second capacitive elements, each of the capacitive elements having a capacitance that varies within a respective range of fluid levels, the system comprising:
- a measuring section for determining a measured capacitance of the first capacitive element and a measured capacitance of the second capacitive element;
- a memory for storing a reference capacitance of said second capacitive element representative of a situation where none of said second capacitive element is submerged in the fluid;
- a calculating section for determining whether conditions are satisfactory for performing a calibration routine, and for, when said conditions are determined to be satisfactory, determining a dielectric constant of the fluid based on a calculation involving the measured capacitance of said second capacitive element and the reference capacitance of said second capacitive element,
- wherein the memory stores a reference capacitance of said first capacitive element representative of a situation where none of said first capacitive element is submerged in the fluid,
- further comprising a comparing section for determining a comparison value based on a comparison of the measured capacitance of said first capacitive element and the reference capacitance of said first capacitive element,
- wherein the calculating section uses the comparison value for a calculation for determining whether said conditions are satisfactory.

16. A gauge suitable for measuring a level of fluid in a container, the gauge comprising:
- a first capacitive element having a capacitance that varies for a first range of fluid levels;
- a second capacitive element having a capacitance that varies for a second range of fluid levels;
- a nonvolatile memory for storing a reference capacitance of said first capacitive element representative of a situation where none of said first capacitive element is submerged in the fluid; and
- a control unit for determining, based on a comparison of a measured capacitance of said first capacitive element to the reference capacitance of said first capacitive element, whether conditions are satisfactory for proceeding with calculating a dielectric constant of the fluid,
- wherein, when said conditions are determined to be satisfactory, the control unit calculates the dielectric constant of the fluid based on a calculation involving a measured capacitance of said second capacitive element and reference information about said second capacitive element.

17. A gauge according to claim 16, wherein the first range of fluid levels and the second range of fluid levels are mutually exclusive.

18. A gauge according to claim 17, wherein the second range of fluid levels is lower than the first range of fluid levels.

19. A gauge according to claims 16, wherein, when said conditions are determined to be satisfactory, and the control unit determines the dielectric constant of the fluid, the thus determined dielectric constant is stored in the nonvolatile memory.

20. A gauge according to claim 19, the control unit determines an amount of fluid based on a calculation including the dielectric constant stored in the nonvolatile memory.

21. A gauge according to claim 19, wherein, when said conditions are not determined to be satisfactory, the control unit does not continue with making a calculation of the dielectric constant.

22. A gauge suitable for measuring a level of fluid in a container, the gauge comprising:

a first capacitive element having a capacitance that varies for a first range of fluid levels;

a second capacitive element having a capacitance that varies for a second range of fluid levels;

a nonvolatile memory for storing a reference capacitance of said second capacitive element representative of a situation where none of said second capacitive element is submerged in the fluid; and a control unit for determining, based on a measured capacitance of said first capacitive element, whether conditions are satisfactory for proceeding with calculating a dielectric constant of the fluid, wherein, when said conditions are determined to be satisfactory, the control unit calculates the dielectric constant of the fluid based on a calculation involving a measured capacitance of said second capacitive element and the reference capacitance of said second capacitive element, wherein, when said conditions are determined to be satisfactory, and the control unit determines the dielectric constant of the fluid, the thus determined dielectric constant is stored in the nonvolatile memory, wherein, when said conditions are not determined to be satisfactory, the control unit does not continue with making a calculation of the dielectric constant, and wherein, when the control unit does not make a calculation of the dielectric constant, the control unit makes subsequent determinations of amounts of fluid based on a calculation including a dielectric constant previously stored in the nonvolatile memory at least until a next determination is made by the control unit as to whether said conditions are satisfactory for proceeding with calculating the dielectric constant of the fluid.

23. A method of maintaining the calibration of a gauge for measuring a level of fluid, the gauge having first and second capacitive elements, each of the capacitive elements having a capacitance that varies within a respective range of fluid levels, the method comprising the steps of:

(a) determining a measured capacitance of the first capacitive element;

(b) determining whether conditions are satisfactory for performing a calibration routine based on a comparison of the measured capacitance of said first capacitive element to a reference capacitance of said first capacitive element; and (c) if said conditions are determined to be satisfactory in step (b), performing the steps of:

(c1 determining a measured capacitance of the second capacitive element, (c2) obtaining previously stored reference information related to said second capacitive element, and (c3) determining a dielectric constant of the fluid based on a calculation involving the measured capacitance of said second capacitive element and the reference information related to said second capacitive element.

24. A method according to claim 23, wherein the reference capacitance of said first capacitive element is a capacitance of said first capacitive element representative of a situation where none of said first capacitive element is submerged in the fluid.

25. A method according to claim 24, wherein step (b) includes retrieving the reference capacitance of said first capacitive element from a nonvolatile memory.

26. A method according to claim 23, wherein step (c) includes the step of:

(c4) storing the dielectric constant calculated in step (c3) in a nonvolatile memory.

27. A method of maintaining the calibration of a gauge for measuring a level of fluid, the gauge having first and second capacitive elements, each of the capacitive elements having a capacitance that varies within a respective range of fluid levels, the method comprising the steps of:

(a) determining a measured capacitance of the first capacitive element;

(b) determining whether conditions are satisfactory for performing a calibration routine based on the measured capacitance of said first capacitive element; and (c) if said conditions are determined to be satisfactory in step (b), performing the steps of:

(c1) determining a measured capacitance of the second capacitive element, (c2) obtaining a previously stored reference capacitance of said second capacitive element representative of a situation where none of said second capacitive element is submerged in the fluid, and (c3) determining a dielectric constant of the fluid based on a calculation involving the measured capacitance of said second capacitive element and the reference capacitance of said second capacitive element, wherein in step (b) the determination as to whether conditions are satisfactory is based on a comparison of the measured capacitance of said first capacitive element to a reference capacitance of said first capacitive element, wherein the reference capacitance of said first capacitive element is a capacitance of said first capacitive element representative of a situation where none of said first capacitive element is submerged in the fluid, and wherein in step (b) the determination is made that conditions are unsatisfactory for performing said calibration routine if the measured capacitance of said first capacitive element is equal to the reference capacitance of said first capacitive element.

28. A method of maintaining the calibration of a gauge for measuring a level of fluid, the gauge having first and second capacitive elements, each of the capacitive elements having a capacitance that varies within a respective range of fluid levels, the method comprising the steps of:

(a) determining a measured capacitance of the first capacitive element;

(b) determining whether conditions are satisfactory for performing a calibration routine based on the measured capacitance of said first capacitive element; and (c) if said conditions are determined to be satisfactory in step (b), performing the steps of:

(c1) determining a measured capacitance of the second capacitive element, (c2) obtaining a previously stored reference capacitance of said second capacitive element representative of a situation where none of said second capacitive element is submerged in the fluid, and (c3) determining a dielectric constant of the fluid based on a calculation involving the measured capacitance of said second capacitive element and the reference capacitance of said second capacitive element, wherein step (b) includes verifying that said second capacitive element is completely submerged in the fluid.

29. A method according to claim 28, wherein step (b) includes verifying that said second capacitive element is completely submerged in the fluid by determining if any portion of said first capacitive element is submerged in the fluid.

30. A method according to claim 29, wherein step (b) includes determining if any portion of said first capacitive element is submerged in the fluid by comparing the measured capacitance of said first capacitive element to a reference capacitance of said first capacitive element.

31. A method according to claim 30, wherein the reference capacitance of said first capacitive element is a capacitance of said first capacitive element representative of a situation where none of said first capacitive element is submerged in the fluid.

32. A method of measuring a level of fluid comprising the steps of:

(a) determining a measured capacitance of a first capacitive element having a capacitance that varies within a first range of fluid levels;

(b) determining whether conditions are satisfactory for performing a calibration routine based on a comparison between the measured capacitance of said first capacitive element and a reference capacitance of said first capacitive element;

(c) if said conditions are determined to be satisfactory in step (b), performing the steps of:

(c1) determining a measured capacitance of said second capacitive element having a capacitance that varies within a second range of fluid levels mutually exclusive from said first range of fluid levels, (c2) obtaining previously stored reference information related to said second capacitive element, (c3) determining a dielectric constant of the fluid based on a calculation involving the measured capacitance of said second capacitive element, and (c4) calculating a fluid level based at least in part on the dielectric constant determined in step (c3); and (d) if said conditions are determined to not be satisfactory in step (b), calculating the fluid level based at least in part on a previously determined dielectric constant.

33. A method according to claim 32, wherein, in step (d), the previously determined dielectric constant is a dielectric constant stored in a nonvolatile memory during manufacturing.

34. A method according to claim 32, wherein step (c) includes the step of:

(c5) storing the dielectric constant calculated in step (c3) in a nonvolatile memory.

35. A method according to claim 34, wherein, in step (d), the previously determined dielectric constant is a dielectric constant stored in the nonvolatile memory during a previously performed calibration routine.

36. A method according to claim when said previous performed calibration routine includes previously performed steps (c1), (c2), (c3), and (c5).

* * * * *

UNITED STATES PATENT AND TRADEMARK OFFICE
CERTIFICATE OF CORRECTION

PATENT NO. : 6,857,313 B2
DATED : February 22, 2005
INVENTOR(S) : Cecil M. Williamson It is certified that error appears in the above-identified patent and that said Letters Patent is hereby corrected as shown below:

Column 7,
Line 3, delete "co" and insert -- $\epsilon_0$ --
Lines 55 and 63, delete "K" and insert -- $\kappa$ --

Column 8,
Line 41, delete "IC" and insert -- $\kappa$ --
Lines 53 and 62, delete "K" and insert -- $\kappa$ --

Column 13,
Line 64, delete "(c1" and insert -- (c1) --

Column 16,
Line 33, delete "when" and insert, -- 35, wherein --

Signed and Sealed this

Seventh Day of June, 2005

JON W. DUDAS
*Director of the United States Patent and Trademark Office*